UNITED STATES PATENT OFFICE.

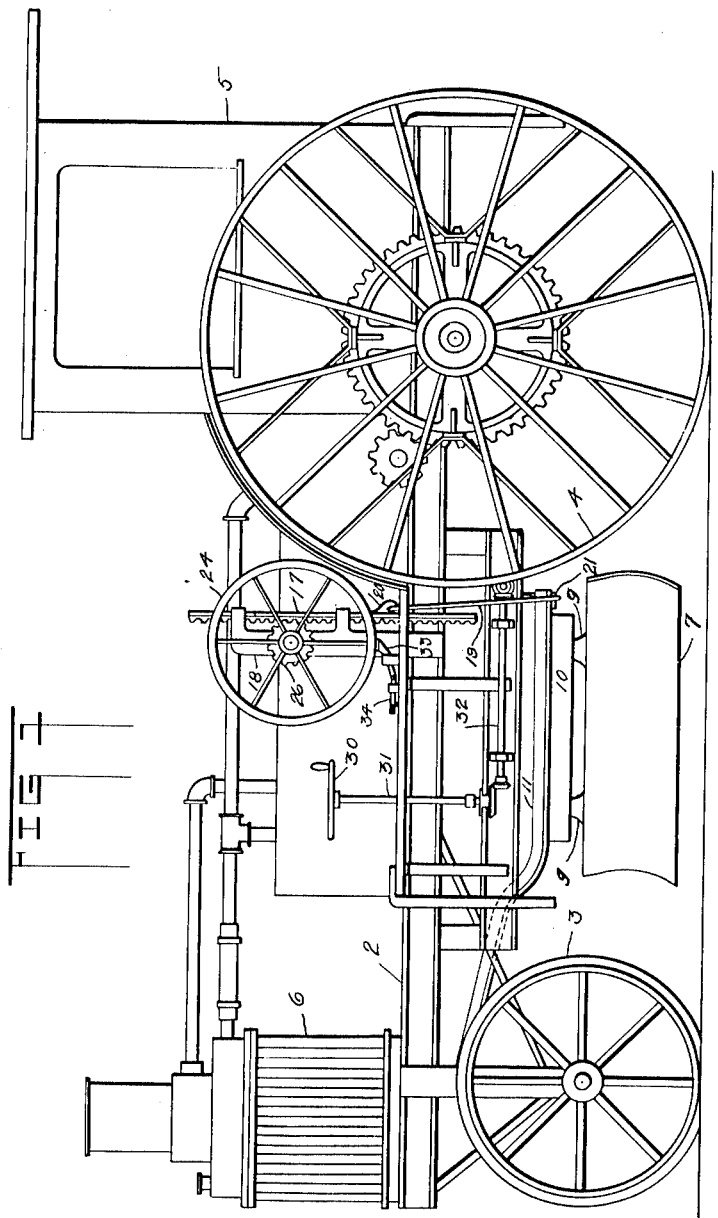

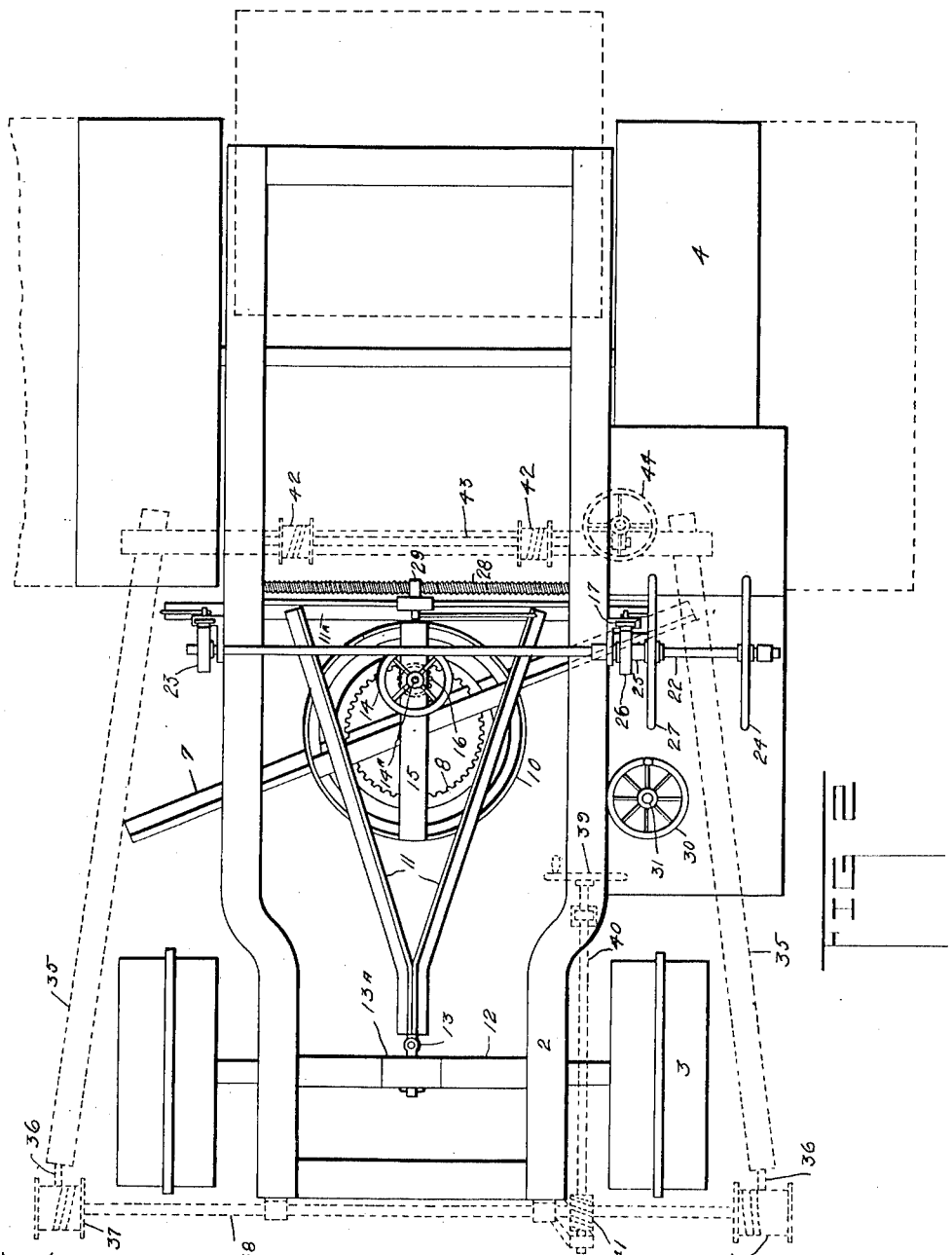

JAMES R. HARRISON, OF PEORIA, ILLINOIS.

TRACTION ROAD-MACHINE.

1,066,811. Specification of Letters Patent. Patented July 8, 1913.

Application filed October 19, 1912. Serial No. 726,656.

*To all whom it may concern:*

Be it known that I, JAMES R. HARRISON, a citizen of the United States, residing at Peoria, in the county of Peoria and State of Illinois, have invented certain new and useful Improvements in Traction Road-Machines, of which the following is a specification.

My invention relates to traction road machines.

More particularly, my invention relates to a combined grading and rolling machine applied to a tractor.

My invention consists essentially of a scraper supported in a vertically and laterally adjustable relation with the tractor; leveler bars likewise laterally and vertically adjustable with relation to said tractor; roller means comprising a tractor wheel, and if desired a supplemental roller disposed at the rear of the scraper and the leveler means; and mechanism for carrying out the several adjustments named.

In the drawings, Figure 1 is a side elevation of my device; Fig. 2 is a plan view of the same.

I am aware that tractors are old; that likewise graders and rollers are old. I am also aware that before my invention graders have been associated with tractors relatively adjustable laterally and vertically and that rollers have been used in connection with such scrapers in front and also at the rear thereof, but have never known them to be associated in a relation to produce the functions particularly designed to be accomplished by my device.

In the drawings, 2 are longitudinal frame bars which are adapted to be connected as shown at their respective ends and they may be connected together at intermediate points.

3 are front wheels of the tractor, the same being suitably connected with the main frame part comprising side bars 2 and connecting portions.

4 refers generally to tractor wheels and 5 to the usual cab that is associated with the tractor.

6 refers generally to a tractor motor, but as such motor constitutes no part of my invention, nor its connection with the tractor to carry out its function, I shall not specify such parts in detail.

7 is a scraper, the same being connected with an open cog plate 8 by means of lugs 9, said cog plate being supported in circular open flanged frame 10 and in turn said frame 10 is supported upon bars 11 which converge as they approach the forward end of the machine and are united at their forward ends, having a universal joint connection with frame piece 12 comprising parts 13, 13ª thereby providing for both vertical and lateral movement of frame 11.

11ª is a transverse bar connecting the rear ends of parts 11.

I have provided means for turning scraper 7 at any angle desired comprising the hand wheel 14 and shaft 14ª, the latter supported in frame parts as 15, extending across and connected with circular frame 10, and a cog wheel 16 meshing with the cogs of plate 8. By turning the hand wheel in the proper direction, the scraper may be shifted to any angle desired to incline rearwardly at either side of the machine.

I have provided means for raising and lowering frame 11 with the scraper and other connected parts and also for applying downward pressure on same, in which 17 refers to cog racks having a vertical slidable relation with standard frames 18, said standards being fixed in connection with side bars 2; 19 refers to links loosely looped into studs 20 on the cog racks and having a similar loop or loose connection with the outer ends of bar 11ª, as at 21, thereby producing a positive push and pull connection between frame 11 and the cog racks, and at the same time permitting lateral play of the frame 11.

22 is a transverse shaft supported in standards 18 and provided with cog wheel 23 thereon engaging one of the cog racks 17. 24 is a hand wheel fixed on said shaft 22.

25 is a sleeve on shaft 22 having cog wheel 26 fixed thereon and meshing with one of the cog racks 17.

27 is a hand wheel.

By means of the connection of the cog racks respectively with cog wheels 23 and 26 and the connection of the latter respectively with shaft 22, and sleeve 25, I am able, by the proper manipulation of hand wheels 24 and 27, to raise or lower frame 11 and with it the scraper 7 as a body from the ground, or I am able to incline the scraper at any angle desired while it is at work.

It is desirable in practical work, that the scraper 7 may be laterally moved so as to meet the conditions of work, and with that end in view, I have provided screw 28 suitably supported in connection with the framework. A threaded block 29 is fixed to transverse bar 11ᵃ of frame 11, and by the proper manipulation of the screw 28, the frame 11 may be shifted toward either side of the machine. For the purpose of manipulating screw 28, I have provided connection from hand wheel 30, comprising bar 31, shaft 32 and the spur gear connection therebetween, as shown, whereby by a manipulation of hand wheel 30 in the proper direction, frame 11 may be shifted to either side, as desired.

For the purpose of supplementing the normal weight upon scraper 7, to hold it to its work, I have provided a common form of friction brake comprising the pivoted parts 33 and 34 for each wheel, the part 33 having a brake connection with hand wheel 24, the normal position of the parts being to establish a brake upon said wheels, and the brake effect may be terminated by applying a weight at the outer end of part 34, the parts being in the jointed relation disclosed. The particular brake means disclosed is not essential to the working of my device, but any suitable brake means may be employed, that shown being merely for the purpose of example.

In Fig. 2, I have shown in a diagrammatic manner, leveler bars adapted under certain requirements of work, to be applied to the surface of the ground in advance of the roller and to a degree to drag free objects to a central point and in position to be embedded by the roller. The levelers may be reasonably heavy bars of any suitable sort. They are indicated in dotted lines in the drawings as 35. At their forward ends they are connected as at 36 to drums 37 on shaft 38, the latter suitably journaled in the framework of the machine. The connecting means 36 is designed to be of a flexible nature as by rope or chain. Shaft 38 is designed to be manipulated from hand wheel 39 through shaft 40, worm wheel 41, and a worm wheel on shaft 38. The rear ends of bars 35 are flexibly supported and connected from drums 42 on shaft 43, which shaft 43 is connected to be turned from hand wheel 44 to wind up or extend the connecting means between drums 42 and bars 35. By means of the flexible connections respectively at the front ends of the drums 37 and at the rear ends with drums 42, any angle desired may be imparted to said bars and the bars may be raised clear of the ground for purposes of transportation or when not in use.

It is my design to utilize the tractor wheels, or one of them as a roller, and to this end, the wheels may be made of any width desired, or it may be made in sections in the common and well known manner, and as indicated in dotted lines in Fig. 2. In fact, both wheels may be made of roller width to facilitate the work of the machine on wet ground.

In conjunction with the wheels, which normally I purpose using as rollers, I may employ a supplemental roller between the wheels, as shown in Fig. 2, but ordinarily one tractor wheel of roller width will perform service effectually and completely.

In the operation of my device, I have designed to combine in a unitary structure, all of the functions and requirements for road grading and to this end, I have provided a scraper which in general practice is embodied in a single machine, a roller which in practice if used at all is, a separate machine and a leveler, which if used at all, is likewise a separate machine. My conception of the use of the tractor wheel as the roller element and arranging it to follow the scraper, is a new combination which effects in operation not only the scraping of the surface of the ground, but effectually packs or embeds the loose dirt, stones and the like within the road, whereas in common practice, such scraps are deposited at the center or some portion of the road, and left loose so as to make that portion of the road practically inaccessible for travel, and in the event of the rain, leaves a muddy strip thereon.

Under some road conditions, a leveling operation may be all that is necessary to keep the road in good condition and in such case the service of the scraper may be dispensed with and the leveler bars may be extended to drag over any portion of the road surface desired, and are always positioned in a relation to the tractor wheel or roller, to deposit in advance of said tractor wheel or roller so as to follow and embed the loose dirt, stones and the like collected, within the road surface, thereby leaving a level, unobstructed surface.

The operation of my device is very simple, and is as follows: When the scraper is employed, it is adjusted at the desired angle to carry out its work, and in a relation to the tractor wheel or roller to deposit the dirt, stones and other loosened material in advance of such tractor roller, whereby as the tractor advances, the loose material will be effectually embedded in the surface of the road, leaving it smooth and hard at all points. As previously explained, the scraper may be positioned at any angle relative to the road surface and is so arranged in connection with its support that its weight will follow the irregularities of the surface freely without manipulation of the hind wheel, and under the tension of the friction brake, it will be held to contact under the degree of tension necessary to enable it to carry out its work perfectly.

The lateral adjusting means provided for the scraper and its support is easily operated and the scraper may be swung from side to side, as desired, to a degree sufficient to meet the requirements of road use, also the scraper may be turned not only at different angles, but also may be turned to discharge at either side of the machine.

The drag bars, as will be observed from an examination of Fig. 2, are readily positioned at any desired angle and to cover any portion of the road that may be desired.

I have shown herein my preferred form of arrangement and embodiment of the elements that go to make up my invention, but following the general relative arrangement of these parts, they may be differently supported, different means may be provided for their adjustment and generally, the structure may be changed without departing from the spirit of the invention, and therefore I do not desire to be limited to the exact construction herein shown, but claim any and all forms of embodiment that fall legitimately within the spirit thereof.

What I claim is:

1. A tractor road machine, comprising in combination with a tractor mechanism, front supporting wheels and rear tractor rollers carrying said tractor mechanism, said rear tractor rollers having widened tread surfaces and being spaced apart substantially the width of the machine, and a scraper adjustable through a sufficient angle to deliver material in front of either roller and so mounted as to deliver material wholly in the path of movement of said tractor rollers in all its angular adjustments, whereby all of the material delivered is crushed and leveled into the road surface.

2. A tractor road machine, comprising in combination with a tractor mechanism, front supporting wheels and rear driving tractor rollers spaced apart substantially the width of the machine and the tread portions thereof being expanded into wide crushing and leveling surfaces, and a scraper between the front wheels and the rear tractor rollers with its ends adapted to deliver material to the rollers in all its angular positions from a position at right angles to the machine to positions where either end lies adjacent the roller surfaces.

3. A tractor road machine, comprising in combination with a tractor mechanism, front supporting wheels and rear tractor rollers carrying said tractor mechanism, said tractor rollers being located in spaced relation substantially the width of the machine and a scraper positioned to scrape throughout its length and angularly adjustable to discharge from either end and extending transversely of the machine within limits to accommodate the discharge of its material from any angular adjustment wholly within the path of movement of said tractor rollers.

4. A road machine comprising in combination, a tractor, front and rear wheels carrying said tractor, said rear wheels being located in spaced relation and serving also as rolling surfaces at the rear of the machine, a scraper arranged to discharge scrapings to said rolling surfaces and drag bars having a flexible connection with the tractor frame and adapted to be extended at the desired angles relative thereto to deliver material in the path of said rolling surfaces.

5. A road machine, comprising in combination, a tractor, front and rear supporting wheels for said tractor, said rear wheels also serving as rolling surfaces and one thereof being expanded to form an enlarged rolling surface, a scraper positioned in front of said rolling surfaces and adjustable vertically, laterally and angularly, and adapted to discharge scrapings to said rolling surfaces, means for effecting said adjustments, and a pair of drag bars having a flexible connection at their ends with said tractor, whereby they may be let down upon the surface of the road and disposed at any desired angle with reference to said tractor to deliver material into the path of said tractor rolling surfaces.

6. A road machine, comprising in combination, a tractor, front and rear wheels carrying said tractor, said rear wheels constituting rolling surfaces and one thereof being expanded to form an enlarged rolling surface, a scraper arranged to discharge scrapings in the path of said tractor wheels rolling surfaces, drag bars having flexible connection with the tractor frame and adapted to be extended at any desired angle relative thereto and means for controlling the angular placement of said drag bars to cause them to deliver material in the paths of said rolling surfaces.

In testimony whereof I have affixed my signature in presence of two witnesses.

JAMES R. HARRISON.

Witnesses:
  MARY E. COMEGYS,
  MORITZA BERG.